(12) United States Patent
Massarotti et al.

(10) Patent No.: US 10,459,502 B2
(45) Date of Patent: *Oct. 29, 2019

(54) ADAPTIVE CHARGE LEVELING IN A DATA STORAGE DEVICE

(71) Applicant: Seagate Technology LLC, Cupertino, CA (US)

(72) Inventors: Christopher A. Massarotti, Longmont, CO (US); John Wayne Shaw, II, Longmont, CO (US); Philip Jurey, Longmont, CO (US); Brian Dean Boling, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 15/331,425

(22) Filed: Oct. 21, 2016

(65) Prior Publication Data

US 2018/0113497 A1    Apr. 26, 2018

(51) Int. Cl.
*H02H 3/00* (2006.01)
*G06F 1/26* (2006.01)

(52) U.S. Cl.
CPC .................................. *G06F 1/266* (2013.01)

(58) Field of Classification Search
None
See application file for complete search history.

(56) References Cited

U.S. PATENT DOCUMENTS

| 4,163,278 A | 7/1979 | Onoue et al. |
| 5,268,871 A * | 12/1993 | Dhong ............... G11C 8/08 327/535 |
| 6,313,616 B1 | 11/2001 | Deller et al. |
| 6,320,278 B1 | 11/2001 | Nishiyama et al. |
| 6,664,657 B2 | 12/2003 | Hailey |
| 7,114,085 B1 | 9/2006 | Kim |
| 7,154,725 B2 | 12/2006 | Chloupek et al. |
| 7,203,777 B2 | 4/2007 | Morita et al. |
| 7,332,832 B2 | 2/2008 | Rowan |

(Continued)

FOREIGN PATENT DOCUMENTS

WO    01/89070 A1    11/2001

OTHER PUBLICATIONS

Office Action for U.S. Appl. No. 14/928,806, filed Oct. 30, 2015, date of the Office Action dated Oct. 31, 2016, 15 pages.

*Primary Examiner* — Stephen W Jackson

(74) *Attorney, Agent, or Firm* — Westman, Champlin & Koehler, P.A.

(57) ABSTRACT

A charge leveler coupled between an external power supply and a data storage device includes a current limiter to receive an input current from the external power supply and to provide a limited input current at no more than a pre-determined level. A charge reservoir couplable in parallel with an output of the current limiter supplements the limited input current when the pre-determined level is exceeded. The charge reservoir is replenished with surplus limited current when the data storage device draws less than the pre-determined level. A boost assist regulator monitors a requested current from the data storage device, and initiates operation of the charge reservoir to supplement the limited input current when the requested current exceeds the limited input current.

20 Claims, 9 Drawing Sheets

(56) References Cited

U.S. PATENT DOCUMENTS

| | | |
|---|---|---|
| 7,746,591 B2 | 6/2010 | Escobar-Bowser |
| 7,761,647 B2 | 7/2010 | Yang |
| 7,782,022 B2 | 8/2010 | Xu et al. |
| 7,783,802 B1 | 8/2010 | Nemazie et al. |
| 8,049,462 B2 | 11/2011 | Kung et al. |
| 8,122,267 B2 | 2/2012 | Rui et al. |
| 8,321,629 B2 | 11/2012 | Hayashi et al. |
| 8,582,227 B2 | 11/2013 | Krishnamoorthy et al. |
| 8,654,551 B2 | 2/2014 | Sase et al. |
| 8,806,271 B2 | 8/2014 | Yong et al. |
| 8,868,938 B2 | 10/2014 | Luo et al. |
| 8,924,641 B2 | 12/2014 | Trantham et al. |
| 9,092,207 B2 | 7/2015 | Zai et al. |
| 9,213,385 B2 | 12/2015 | Berke et al. |
| 9,240,742 B1 | 1/2016 | Erickson et al. |
| 2001/0003205 A1 | 6/2001 | Gilbert |
| 2005/0134239 A1 | 6/2005 | Harris et al. |
| 2010/0185879 A1 | 7/2010 | Shaver |
| 2011/0107124 A1 | 5/2011 | Tupman et al. |
| 2012/0011376 A1 | 1/2012 | Zai et al. |
| 2012/0223581 A1 | 9/2012 | Conrad |
| 2013/0027121 A1 | 1/2013 | Yoon |
| 2013/0290742 A1 | 10/2013 | Lin et al. |
| 2013/0339757 A1 | 12/2013 | Reddy |
| 2014/0108846 A1 | 4/2014 | Berke et al. |
| 2014/0306529 A1 | 10/2014 | Yin et al. |
| 2014/0320091 A1 | 10/2014 | Kung |
| 2015/0021995 A1 | 1/2015 | Chang et al. |

* cited by examiner

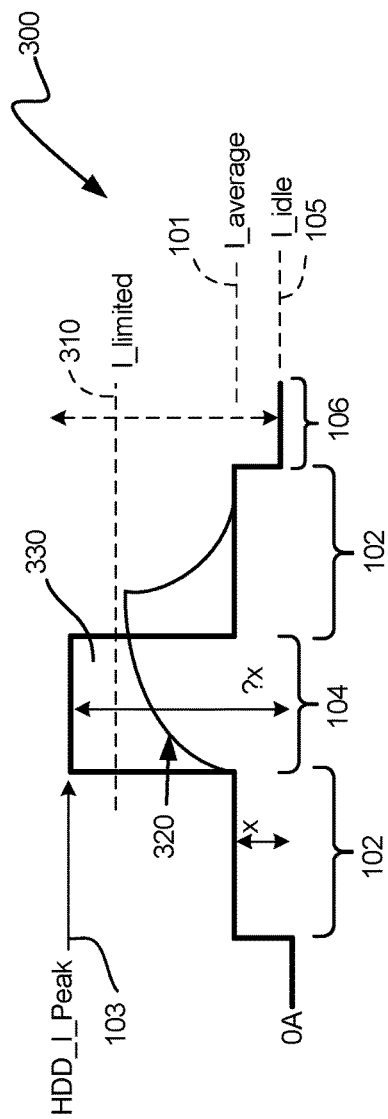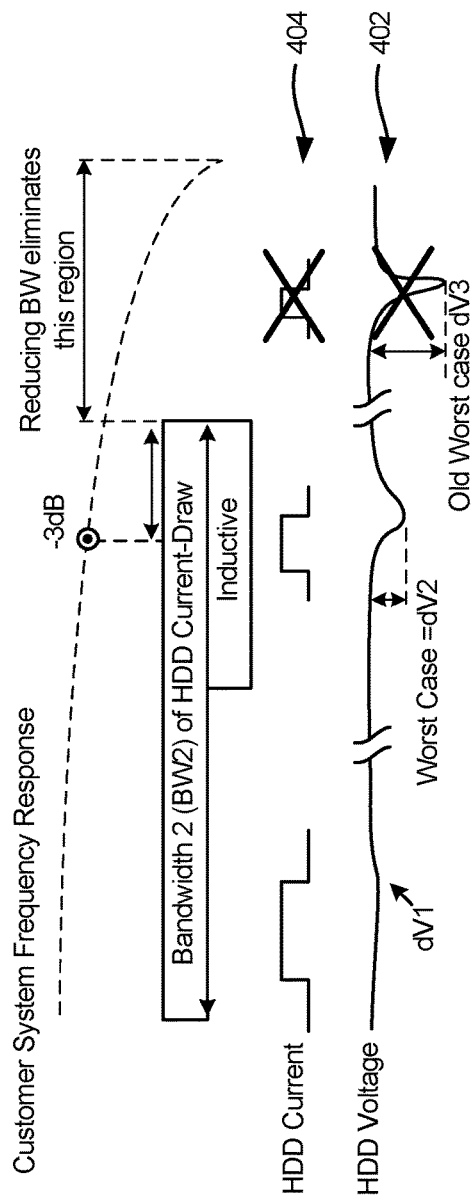

ADAPTIVE CHARGE LEVELING IN A DATA STORAGE DEVICE

BACKGROUND

Data storage/memory devices are one of many components of modern computers. Examples of data storage devices include hard disk drives (HDDs), which are electromechanical devices containing spinning discs and movable read/write heads, solid state drives (SSDs) with no moving parts, and hybrid drives, which combine features of HDDs and SSDs in one unit. Data storage/memory devices are also present in many additional devices, such as table computers, smart phones, and the like.

In data storage devices, especially HDDs, and in hardware such as servo application specific integrated circuits (ASICs) and printed circuit board assemblies (PCBAs), peak current levels in relation to average current levels present challenges to a host power supply in several ways. First, the ratio of peak current to average current drawn by, for example, a HDD coupled to draw power from a host, is often 4:1 or higher. This ratio may cause the host power supply design to be difficult. For example, designing for peak current may result in excess costs and unnecessary components, while designing for average current may not allow enough current to be available for device operation. If the power supply must provide sufficient current for all situations, then significant additional costs may be incurred in the design.

Second, the slew rate for changing currents is high, which can cause high frequency harmonics in the power distribution system for the storage device. This can potentially cause inductive losses in the storage device to become an issue, especially in server racks during spin-up of a HDD. As with peak to average current ratios, a high slew rate can complicate design of power distribution systems.

SUMMARY

The present disclosure relates to charge leveling of current provided by a host device to a data storage device, when the host device has a limited amount of current available, and the storage device may have current demands that exceed the amount of current available from the host device.

In another embodiment, a charge leveler configured to be coupled between an external power supply and a data storage device includes a current limiter that is configurable to provide a limited current at a pre-determined maximum level. A charge reservoir is coupleable in parallel with the current limiter output to supplement the limited input current to the data storage device when the pre-determined level is exceeded. The current limiter replenishes the charge reservoir with surplus current during the time when the data storage device draws less than the current limiter's pre-determined maximum value.

In yet another embodiment, a charge leveler is coupled to an external power supply. The charge leveler resides on the external power supply and not on the data storage device.

In a method embodiment, a method for charge leveling an input current provided to a data storage device from an external power supply includes limiting the input current to a pre-determined maximum level supported by the external power supply, and supplementing the limited input current with a charge reservoir and/or a boost assist regulator.

This summary is not intended to describe each disclosed embodiment or every implementation of the charge levelers as described herein. Many other novel advantages, features, and relationships will become apparent as this description proceeds. The figures and the description that follow more particularly exemplify illustrative embodiments.

BRIEF DESCRIPTION OF THE DRAWINGS

FIG. 3 is a graphical example of a relationship between peak and average current used by a storage device according to an embodiment of the present disclosure;

FIG. 4 is a bandwidth graph showing the effect of current on voltage for the current of FIG. 2 according to an embodiment of the present disclosure;

DETAILED DESCRIPTION OF ILLUSTRATIVE EMBODIMENTS

In general, the present disclosure relates to lowering amplitude and bandwidth in current draw from a host device that provides power for an external storage device, such as a hard disc drive. Peak current draw from the host and current bandwidth is managed. This may have particular advantages in multiple-disc drive systems since different levels of peak current may be requested by different storage devices, and when large groups of HDDs are used, power management tasks increase.

A current limiter limits current draw from the host device. A reservoir for provision of current to a storage device is charged and maintained in reserve, so that if the maximum limited current for the host device is exceeded, the reservoir provides the difference between the limited current and the peak current. A boost regulator may also be used to allow the reservoir to continue providing reserve current to the storage device, even for energy deficits that place the reservoir below the minimum required level for normal storage device operation. This reduces the size of capacitance needed to sustain storage device operation for given current deficits. Transients are therefore covered with only a modest increase of the peak current used from the host device. Recharging of the reservoir occurs after a transient subsides, and since the reservoir can be expected to only be used during short duration modes of operation for a HDD (e.g., seek and head load modes of operation), which are less than a 50% duty-cycle, recharging time is sufficient to allow continued operations with little or no measurable performance degradation.

Charge leveling is used at least in servo-ASIC hardware, printed circuit board assembly (PCBA) hardware, and handshaking between a host and a storage device such as a hard disc drive (HDD) to facilitate current management. Current management continues to be important, especially as allowed current draws from a host are smaller and smaller. In a storage device, high current spikes that exceed the allowable current draw from a host device can lead to failure of the storage device, shutdown of the storage device, power-on-reset of the storage device, and the like. Control of current drawn from a host device by a connected storage device allows host device manufacturers to consistently plan and design devices in an efficient way.

Embodiments of the present disclosure act to control high current spikes and distribute the usage of high current over time.

Figure 1:
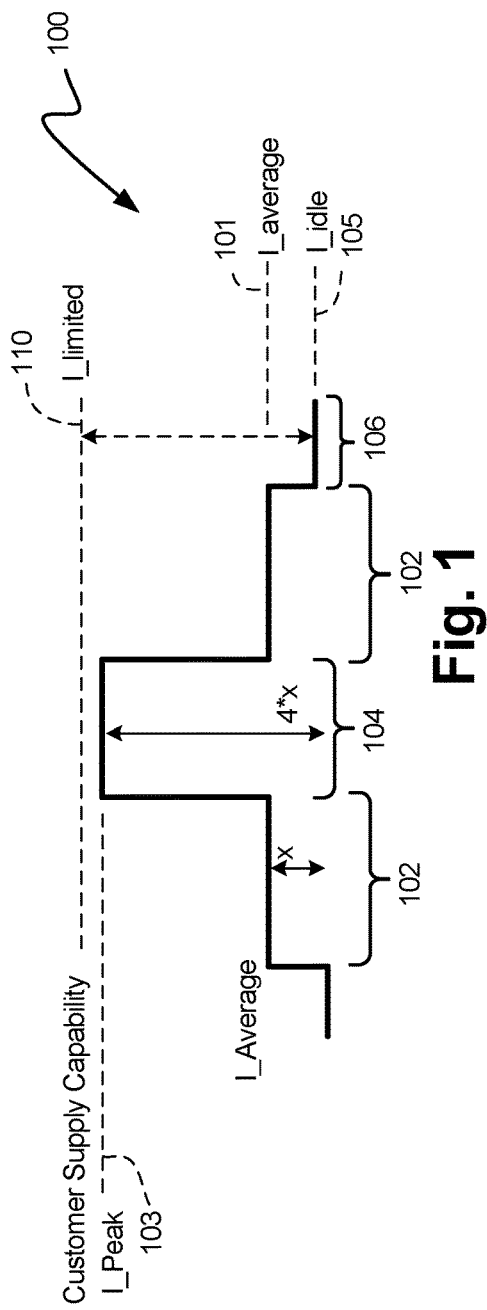
FIG. 1 is a graphical example of a typical relationship between peak and average current used by a storage device.

A typical current graph 100 for current used by a storage device is shown in FIG. 1. Graph 100 shows an average current draw for a device I_avg 101 that is drawn in regions 102, peak current I_peak 103 that is drawn in region 104, such as during spin up, seek, and head load operations of an HDD, and idle current I_idle 105 that is drawn in region 106, typically by coils in the HDD. To provide suitable current for all regions, a host device, or customer supply capability, is provided to exceed the highest amount of current I_peak 103 that will be drawn in region 104 by the storage device, as indicated by I_limited line 110. I_peak can be four times as much as I_avg. One byproduct of high current and high frequency spikes is that there is an inductive sag in the line at higher frequency. This is shown in graphical form in FIG. 2. As may be seen in line 202, as frequency increases, shown by decreasing pulse width in pulses 204, inductive sag increases dV1, dV2, and dV3. The sag is smallest for the least wide (e.g., low frequency) pulse width, and largest for the smallest (e.g., high frequency) pulse width.

Figure 2:
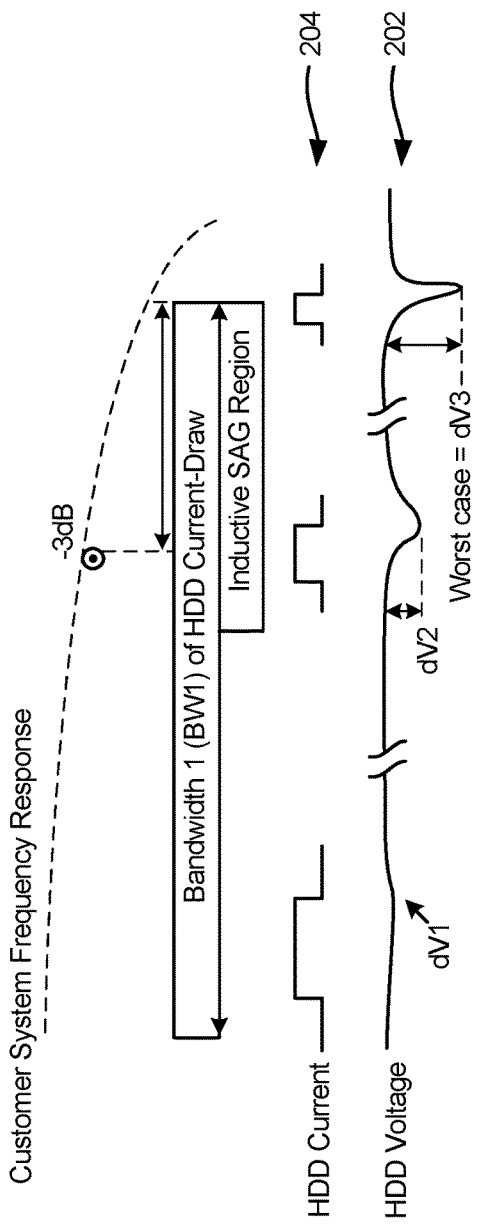
FIG. 2 is a bandwidth graph showing the present effect of current on voltage for the current graph of FIG. 1.

Embodiments of the present disclosure lower the frequency of pulses by extending pulse time, and the use of low pass filtering, shown graphically in FIG. 3. In the graph 300 of FIG. 3, the current draw graph for a storage device is the same as that shown in FIG. 1. However, the available customer supply current 310 (I_limited) is limited to below the I_peak current 103. The embodiments of the present disclosure supplement the available current from a host device by increasing the pulse width of the current draw to allow for a lower peak current. This allows the embodiments to limit the current draw seen by the host device to no more than its supply capability. The current draw seen by the host device is shown as line 320 in FIG. 3. The embodiments of the present disclosure, as described in further detail below, provide the current in the range 330 that is above the host device limit 310. Accordingly, the embodiments of the present disclosure reduce bandwidth, as shown in graphical form in FIG. 4, which in turn reduces the effects of inductive sag by reducing the portion of current draw that is affected by inductive sag. As may be seen in line 402, the largest inductive lag region of FIG. 2 is removed in this embodiment, because the highest frequency pulses 404 are supplied by the reservoir on the output of the current limiter instead of by host power supply.

Figure 5:
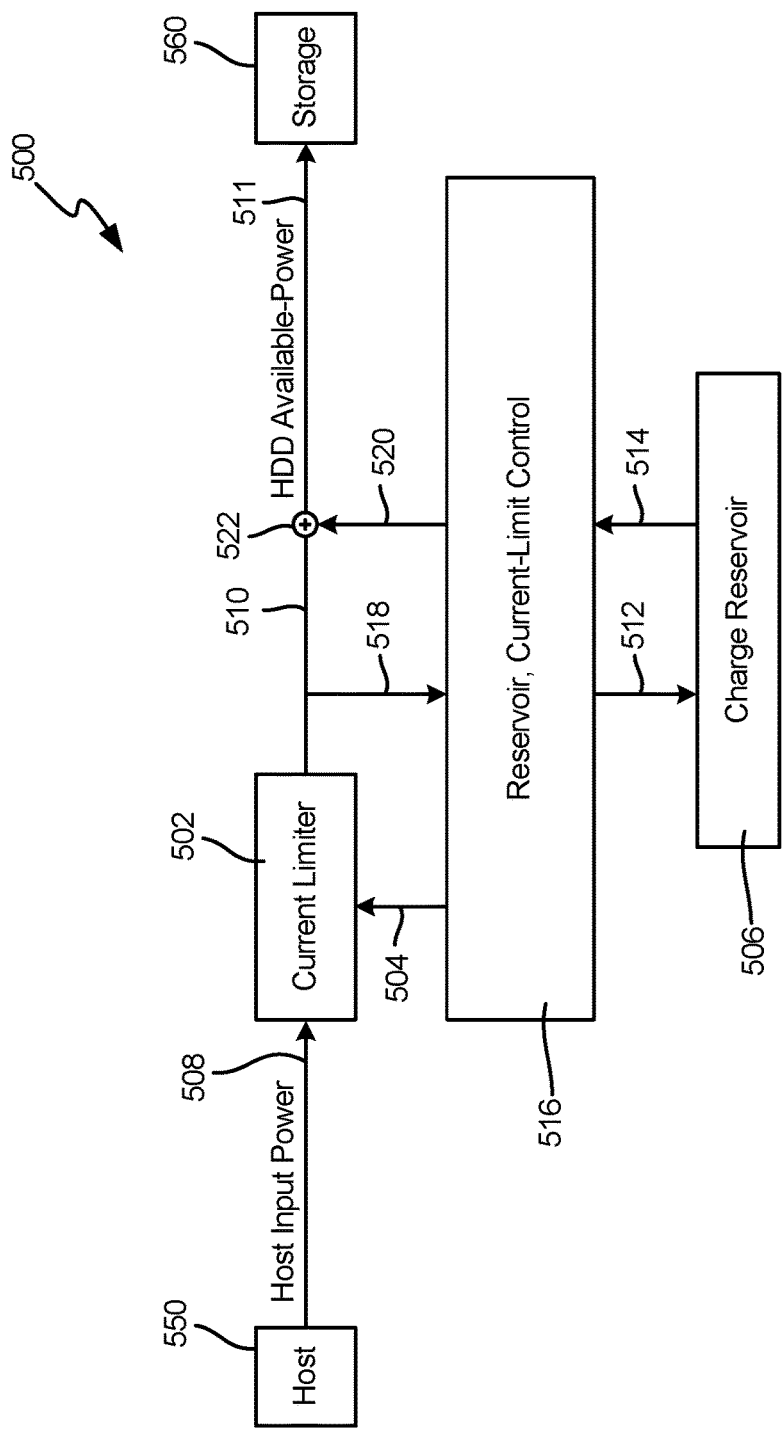
FIG. 5 is a general block diagram of charge leveler according to an embodiment of the present disclosure.

A charge leveler 500 according to an embodiment of the present disclosure is shown in block diagram form in FIG. 5. Charge leveler 500 comprises in one embodiment a current limiter 502 and a charge reservoir 506. Input power 508 from a host device 550 is subject to an imposed current limit 504 input to current limiter 502, which facilitates a pre-determined peak current 510 that is available from the host device 550. When requested current 511 from a storage device 560 exceeds the current 510 available from the input power 508 from a host device 550, the charge reservoir 506 provides an assist current 514/520 to the pre-determined peak current 510 provided by current limiter 502 to provide the requested current 511 to the storage device 560. The assist current and the pre-determined peak current are summed at a summing junction 522. When the requested current 511 from the storage device 560 is less than the current 510 available from the input power 508 from host device 550, and the charge reservoir 506 is not at full charge, the charge reservoir 506 charges using available current 510 (e.g., 508 minus 560) as a charge current 518/512. That the available (surplus) reservoir charge current is equal to the difference between the pre-determined peak current and the data storage device current (which is now low due to a low-power mode such as Idle).

Charge reservoir and current limit controller 516 in one embodiment provide the digital and/or analog current limit signal(s) 504 to the current limiter 502, and senses the requested current draw 511 to determine the relationship between the data storage device requested current 560 and the pre-determined peak current 510 from the current limiter 502. From these two currents 510 and 560, the current limit controller generates a representation of the available current, which will be positive if the data storage device requested current 511 is less than the pre-determined peak current 510 (Idle mode or equivalent) and negative if the data storage device requested current 511 is greater than the pre-determined peak current 510 (Seek/Head-Load). When the available current is positive, controller 516 charges the charge reservoir 506 using charge current drawn via charge current lines 518/512. When the requested current 511 exceeds the pre-determined peak current 510, the available current is negative and controller 516 generates an assist current 514/520 provided by the charge reservoir 506. When charge reservoir 506 is fully charged, no charge current is drawn. Controller 516 may be used to provide the current limit signal(s) 504, which is adjustable depending upon the host device 550, or limits for maximum current draw therefrom. This embodiment limits the amount of current 508 drawn from the host device, and allows for more efficient design of the host device 550. The current limiter 502 reduces the shock of a peak current spike in the requested current from the storage device 560. The controller 516 adjusts the current limiter's pre-determined peak current 510 to match the maximum host current draw 508 and connects the charge reservoir 506 for charging when excess current is available from the host device 550, and disconnects the charge reservoir so that it can independently provide for assist current 514/520 without burdening the host current 508 when excess current is requested by the storage device 560.

The charge reservoir 506 is in one embodiment a capacitor. Depending upon the size of the capacitor used for the charge reservoir, current draw from the host device may be reduced by as much as two thirds (approximately 18 dB) for frequencies down as low as 30 Hz or lower. The lower the frequency, the larger the capacitor to be used. For example, using a 47 microFarad (µF) capacitor, current draw reduction can be made down to about 20 kHz. With a 470 µF capacitor, current draw reduction can be made down to about 8 kHz. With a 470 milliFarad capacitor, virtually all storage device current spikes may be reduced by approximately 18 dB down to about 6 Hz. However, larger capacitors are expensive and large in size, and this price/size liability presents its own difficulties for any consumer device, the size of which is similar to host devices, storage devices, and charge levelers as discussed herein.

Figure 6:
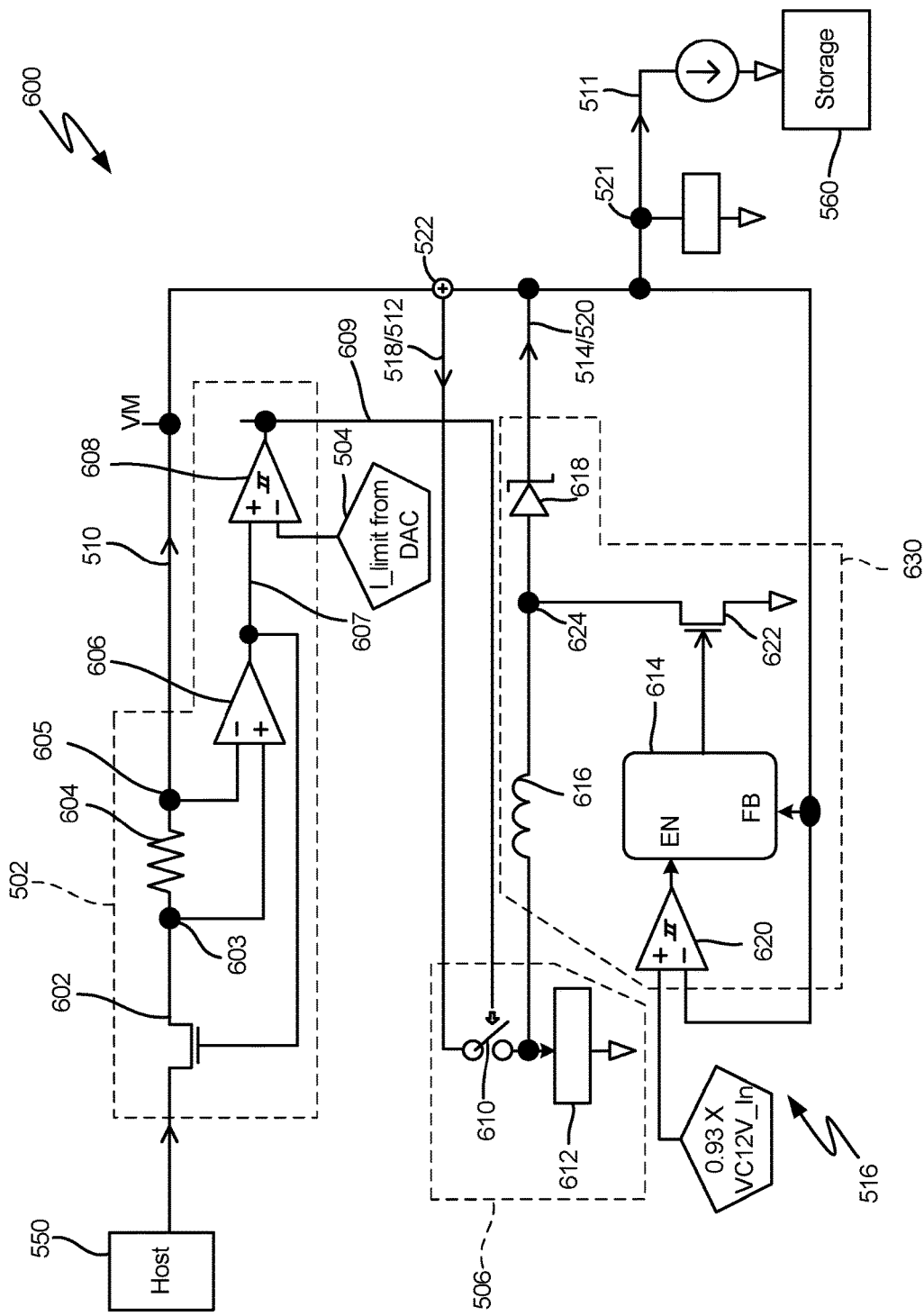
FIG. 6 is a more detailed block diagram of charge leveler according to another embodiment of the present disclosure.

Charge leveler 500 is described in greater detail as shown in FIG. 6. Charge leveler 600 connects a host device 550 to a storage device 560, with charge leveler 600 providing proper current for operation of storage device 560 using a current limit imposed by host device 550. Current limiter 502 comprises an isolation field effect transistor 602 coupled to pass current from host device 550 to sense resistor 604. Isolation transistor 602 is gate coupled to output from amplifier 606, which has its positive and negative terminals coupled to ends 603 and 605 of sense resistor 604. The amplifier 606 output controls the isolation transistor 602 and provides the positive input 607 to comparator 608. The negative terminal of comparator 608 is coupled to the determined host current limit 504. The output 609 of comparator 608 is used to determine whether the sensed current 510 is within the host limit 504. If under the limit, then reservoir 506 is to be charged with the available current (504 minus 510). If over the limit, then reservoir 506 is disconnected from the current limiter to operate independently and is used to indirectly provide assist current 514/520 to the host current provided by host device 550 for use by the storage device 560.

Depending on whether the data storage device current 511 is less than or greater than the host maximum limit, switch 610 is coupled to either pass (when 511 is less than the limit) or to block (when 511 is greater than the limit) nominal current 510 provided by the current limiter to capacitor 612. Capacitor 612 and switch 610 in one embodiment comprise charge reservoir 506. When capacitor 612 is being charged, switch 610 is closed. When capacitor 612 is providing an assist to current 510, switch 610 is open. When capacitor 612 is fully charged, the switch 610 may be in either position.

In operation, the isolation transistor 602 is a front end for current limiter 502. The gate of transistor 602 is choked to limit the current 510 provided from the host device 550. Sense resistor 604 is used by amplifier 606 to determine the amount of current 510 being drawn from host device 550, and the comparator 608 compares that current draw with the current limit 504 set by the host device 550, or otherwise set to a particular determined current limit.

Current limit controller 516 in one embodiment comprises not only current control, but also provides a boost assist regulator 630 for the provision of boost assist current 514/520, Boost assist regulator 630 comprises boost assist controller 614, boost assist inductor 616, boost assist Schottky diode 618, comparator 620, and boost assist charge transistor 622. Boost assist inductor 616 and boost assist Schottky diode 618 are coupled in series between reservoir capacitor 612 and a conductor carrying nominal current 510. The input of boost assist controller 614 receives the output of comparator 620. Comparator 620 compares the sensed voltage 521 of the data storage device 560 with a slightly reduced version of the nominal voltage of the host supply device 550. The slightly reduced version of the host supply voltage is typically (but not necessarily) the lower specification limit for the host/device interface, below which operation of the storage device 560 or host device 550 may be compromised. In one embodiment, the slightly reduced voltage limit is set at 93% of the host supply nominal voltage, although it should be understood that the voltage limit may be set at a different level without departing from the scope of the disclosure. Boost assist transistor 622 is coupled source-o-drain between a node 624 (e.g., the junction of inductor 616 and the anode of boost assist Schottky diode 618) and a reference voltage (e.g., ground), and is controlled at its gate by the boost assist controller 614 for the purpose of charging the inductor 616 for a boost cycle.

When the nominal output voltage 521 to the data storage device 560 drops below the slightly reduced version of the host supply voltage limit (93% in one example), the comparator 620 output triggers operation of the boost assist controller 614 to supply a boost assist pulse or pulses to the gate of transistor 622 in order to short inductor 616 to the reference voltage, thus storing a packet or packets of current received from reservoir capacitor 612, which is now disconnected from current 510 and is operating independently. When boost assist controller 614 turns transistor 622 off, the inductor 616 fly-back applies the charge which it received from reservoir capacitor 612 (during the charge cycle) to apply current 514/520 through Schottky 618 in assisting the now-limited current 510. The sum of currents 510 and 514/520 will now be greater than or equal to the data device current 511 and the data device voltage at 521 will again increase to a value greater than or equal to the slightly-reduced lower limit of the host supply. If voltage 521 exceeds the slightly-reduced host supply limit, comparator 620 will disable assist controller 614 and no more charging pulses will be issued to inductor 622. Otherwise comparator 620 and controller 614 will continue issuing charging pulses and thus assisting current 510 with shunt current 514/520 through Schottky 618.

In the operation of the boost assist regulator 630, the charging pulses of boost assist controller 614 are inversely proportional to the voltage present on the charge reservoir capacitor 612. As the charge reservoir capacitor 612 depletes through the provision of boost assist current 514/520, so does the initial voltage difference (ΔV) across the boost assist inductor 616. Hence, the duty cycle of each charging pulse is increased in order to maintain a constant current (since dI=(V/L)*dT). This type of operation of a boost regulator such as boost assist regulator 630 is known. However, use of a pre-charged and disconnected charge reservoir 506 combined with boost assist regulator 630, allows for the generation of a shunt boost assist current 514/520 even when the voltage across the reservoir would normally go below the minimum spec-limit for the host and/or data storage device. Without the boost assist regulator 630 and isolation of the reservoir capacitor 612, the lowest operational voltage drop that could be tolerated (due to a current deficit where current 510 is less than current 511) would be in the range of 10%-15%. With a disconnected reservoir and shunt boost assist regulator, the "equivalent" voltage drop would be in the range of 40%-50%. This means that smaller capacitors could be used to mitigate data storage device current deficits. Charge levelling aspects of the system 600 are described further below.

Various modes of operation of a system 600 providing power/current from a host device 550 to a storage device 560 are as follows. Each has its own set of current characteristics, that determine what tasks the system will be performing during operation.

PON (Power ON): In an initial power on of the devices 550 and 560, the charge reservoir 506 is not yet enabled, so the only current flowing is the host current 510 from the host to the coils of the storage device 560 (e.g., COIL_A-C spin and VCM via a VM bus). This current 510 is low since motors of the storage device 560 are not yet enabled.

Charge0 (Initial Charge): Most of the host device 550 current 510 is directed to the now-enabled charge reservoir circuit via switch 610 being closed, and a small current drawn from the storage device 560. Most of the current 510 is directed to charging the reservoir capacitor 612. A small storage device current is still being consumed by storage device and charge leveler 600 logic, but most of the host device 550 current 510 is charging the reservoir capacitor 612.

Spinup: This is a higher current operation of the storage device 560. All host device 550 current 510 is directed to the storage device. In this operation, the spinup current of the storage device is programmed-in not to exceed the current limit 504. This is done since spinup occurs at duty-cycles up to 98%. Therefore, the charge reservoir 506 (which relies on low duty cycle events) is of little use.

Idle0, Idle1: Not to be confused with Power Modes of the firmware of the storage device 560, idle states are states where the storage device 560 is naturally running in a mode where there is a surplus of host device current 510 available for operations, and the reservoir capacitor 612 is fully charged. In this mode, all current 510 from the host device 550 is directed to the coils of the storage device 560. This is similar to Spinup except that the current-draw 511 is less than the current limit 504 of host device 550.

Seek: All host device 550 current 510 is directed to the storage device 560. The charge reservoir 506 is disconnected from the current 510 through the opening of switch 610. In this operation and configuration, the charge reservoir 506 is available to supply the boost assist current 514/520 via the boost assist inductor 616 and boost assist Schottky diode 618 as controlled by the boost assist controller 614. In this mode, host device current 510 and boost assist currents 514/520 are active and combine to provide the current 511 requested by the storage device 560.

The seek mode contains low duty-cycle, high-current situations, where the charge reservoir 506 shields the host device voltage (and therefore current) supply, thus creating a temporary current-deficit from the host device 550 that is assisted by the charge reservoir 506 and the boost assist regulator 630. Typically for a seek operation, current spikes arrive in pulse pairs separated by a short time interval.

Head Load: This mode is similar to the seek mode with the exception that the pulse pairs are typically asymmetrical (e.g., the first pulse is wider than the second pulse but lower in amplitude by ~20%), and average out to be equivalent to a longer duration (which more aggressively depletes the charge reservoir 506). Hence, the design of the charge reservoir 506 and the boost assist regulator 630 are typically made to provide adequate boosting for the head load mode, as it typically demands the largest current draw 511.

Charge1 (Charge Reservoir 506 Recharge): This mode typically immediately follows a seek or head load operation, after each of which the charge reservoir 506 has likely been at least somewhat depleted. It is similar to the Charge0 (Initial Charge) mode with the exception that the requested current 511 by the storage device is a small idle current. In this mode, the host device 550 current 510 is divided between the requested current 511 (an idle current) and the reservoir charge current 518/512. No boost assist current 514/520 is provided in this mode.

Figure 7:
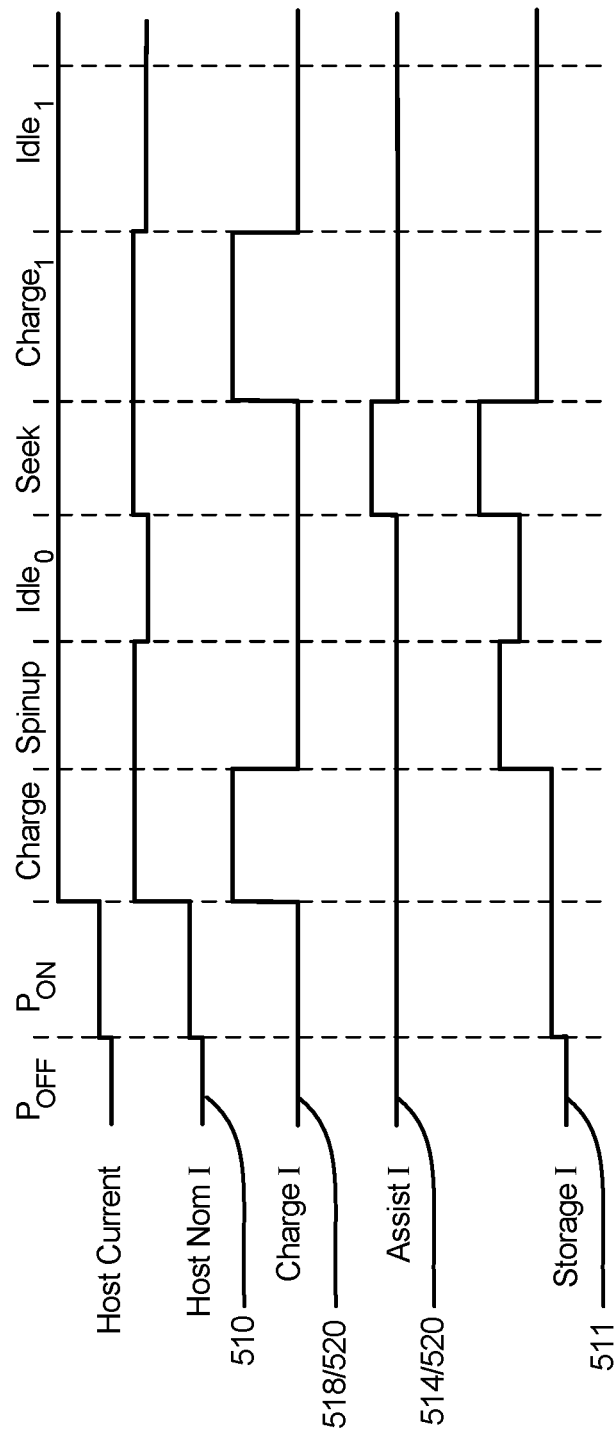
FIG. 7 is a functional graph of related currents in the embodiment of FIG. 6 during stages of operation thereof.

A table showing waveforms of the currents for each of the modes described above is shown in FIG. 7.

Examples of operation of the charge leveler 600 follow.

In one example, current limit 504 is set to 1.25 Amperes (A). An idle operation draws 500 milliAmps (mA). In this example, there is a 750 mA surplus current that can be used for charging the charge reservoir 506. When the current draw 511 is less than the available current 510, the switch 610 may be closed to provide up to the surplus current to be used for charging the reservoir capacitor 612. Even though the storage device is only drawing 500 mA, the full available 1.25 A is used, with the surplus 750 mA used to charge the reservoir capacitor 612. When the reservoir capacitor is fully charged, the switch 610 is opened, and the current draw seen by the host device 550 drops to 500 mA. In this operation, current sense circuitry of the reservoir capacitor senses its full charge, and opens the switch 610. This isolates the charge reservoir 506 from the host device 550.

In this example, in a head load mode, the storage device requested current is 1.65 A. As the host device current limit 504 is 1.25 A, the host current 510 is at a 400 mA deficit. The host cannot supply this level of current. In this situation, the nominal voltage 521 at the data storage device 550 drops. This drop (and the resultant nominal voltage) is compared using comparator 620, with the smaller voltage limit (in one embodiment 93% of the nominal voltage), and when the nominal voltage drops to the smaller voltage limit, comparator 620 turns on the boost assist regulator 630. The boost assist controller 614 begins boosting the voltage which is stored on the charge reservoir 506, and provides boos assist current 514/520 through the boost assist inductor 616 and boost assist Schottky diode 618 in parallel with the current 510 flowing from the host device 550 to provide the requested current 511 to the storage device 560.

Figure 8:
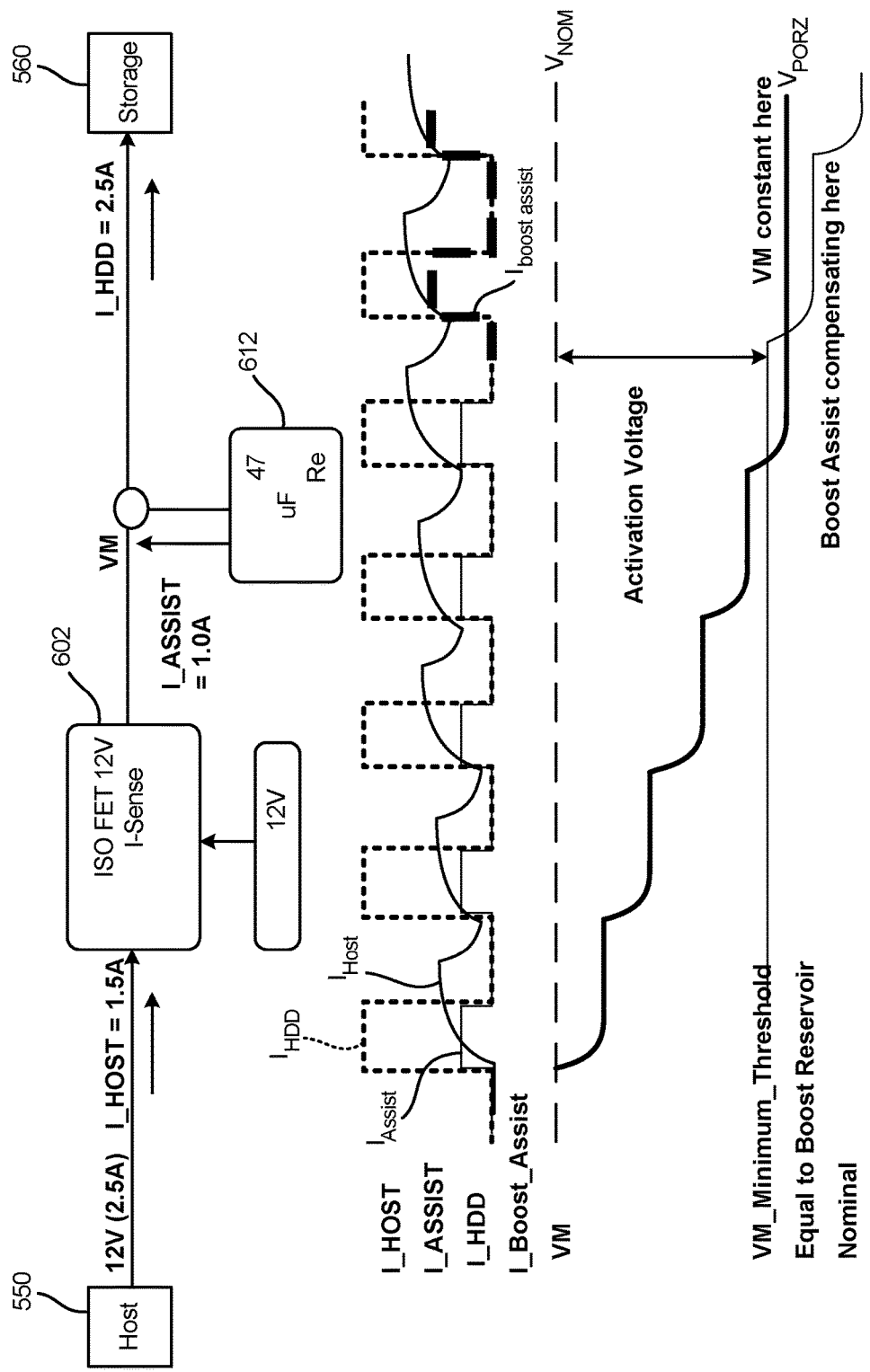
FIG. 8 is a representation of the relationship between a current limiter, a data storage device current, and a reservoir level of a charge leveler of the embodiments of FIGS. 5 and 6.

A graphical representation of the operation of the boost assist regulator 630 and charge reservoir 506 in conjunction with current supplied by a host device 550 are shown in FIG. 8. An abbreviated block diagram of the voltage supply of a host device 550 is shown, with isolation transistor 602 and reservoir capacitor 612 shown. In an example, host device 550 can provide 12 V, and its current is limited to 1.5 A. If a storage device (e.g., an HDD) requests a current of 2.5 A, there is a 1 A deficit. This deficit is provided by the boost assist current from the regulator 630 (not shown) and the reservoir capacitor 612. During the time period until the boost assist regulator 630 turns on, in one embodiment when the nominal voltage (12 V in this example) drops to less than 0.93*12V, the nominal voltage VM drops with each request from the storage device 560 for a current that exceeds the available 1.5 A from the host device 550.

Should a large capacitor (e.g., 4.7 mF) be used, it would be thought that this large capacitor value would allow for the capacitor to provide all assist current that would be requested in excess of the available host device current. However, if the host device nominal voltage (VM) is 12 V, for example, and the power on reset voltage (POR-Z) for the storage device 560 is 10 V, the ΔV is only 2 V. This small voltage difference, to sustain all excess current requests above the current limit from the host device, would, because C=q/V, use a very large capacitor, such that the cost and size would be prohibitive. Instead, the reservoir capacitor 612 may be, since it is only supplying the input of the boost assist regulator 630, be drained to a much lower level than the POR-Z threshold. After a said event, the smaller capacitor can be more readily recharged from the lower depleted voltage. With a boost assist regulator 630 running at approximately 85% efficiency, the nominal voltage may drop to 50% or less of the initial voltage without a power on reset event. Once the data storage device voltage 521 drops below the minimum threshold voltage, the boost assist regulator 630 turns on to hold the nominal voltage constant.

Figure 9:
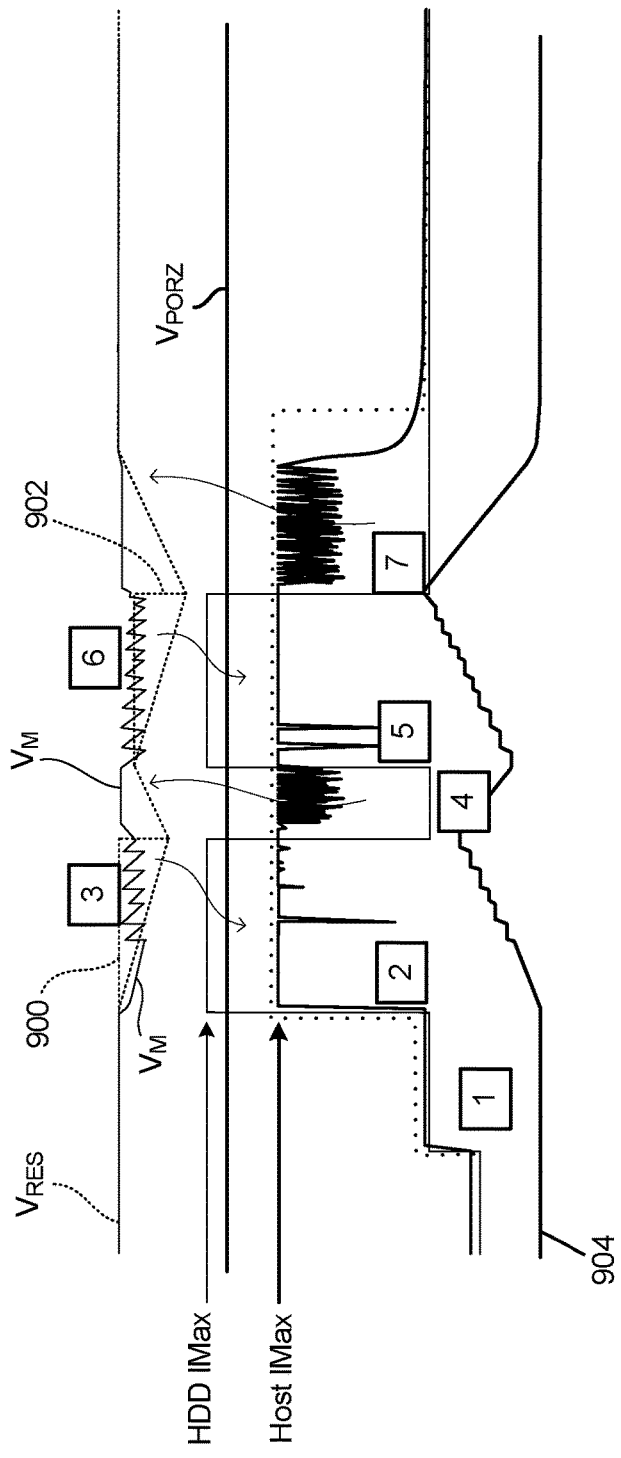
FIGS. 9 and 10 are graphs showing host/data storage device current levels for various nominal voltages of a host device using embodiments of the present disclosure.
Figure 10:
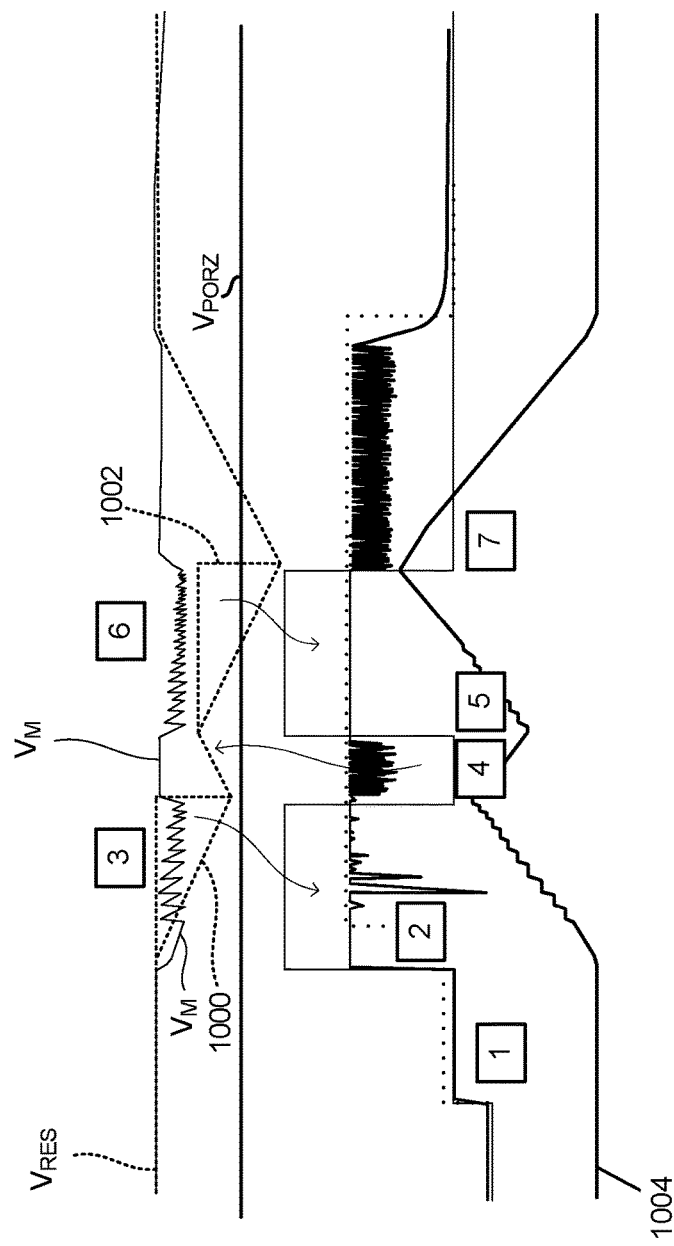

FIGS. 9 and 10 further show the operation of the currents in various modes for a nominal voltage of 13.2 V and 12 V, respectively. Referring to FIG. 9, in region 1, the storage device is drawing an idle current, which is supplied by the host device.

In region 2, the storage device current requested spikes to above the available current from the host device. The current limiter allows the host device to provide its maximum allowed current, and therefore, the data storage device nominal voltage 521 begins to decay until it reaches its limit of 93% of the initial 13.2 V.

In region 3, the boost assist regulator 630 begins switching on and off to supply the extra requested current to cover the deficit. The total charge depleted from the charge reservoir is represented by triangle 900 in FIG. 9. The boost assist regulator duty cycle (bottom ascending saw-tooth pattern 904) is shown to increase to maintain the current to the storage device.

In region 4, the storage device is in the rest period between two head load pulses, dropping the requested current from the storage device, and allowing the reservoir capacitor to be charged with surplus current. The duty cycle line decreases as its output is based on the value of the charge in the reservoir capacitor.

In region 5, the second head load pulse occurs, and the current limiter limits the host device current, and the actions of region 3 repeat.

In region 6, the nominal voltage has dropped to a level that turns on the boost assist regulator.

In region 7, the second head load pulse ends and the host device current is once again greater than the requested current from the storage device. The reservoir is charged once again. This recharging cycle is longer than the current recharging cycle. The lower the voltage from the host device, the more the charge reservoir is depleted. The more the charge reservoir is depleted, the harder the boost assist regulator works, and the longer the host will take to recharge the charge reservoir. So, spikes in requested current that exceed the available limited current from the host device are absorbed by the charge reservoir and the boost assist regulator.

FIG. 10 shows a similar operation with a nominal host device voltage of 12 V. The total charge depleted from the charge reservoir is represented by triangles 1000 and 1002 in FIG. 10. The boost assist regulator duty cycle (bottom ascending saw-tooth pattern 1004) is shown to increase to maintain the current to the storage device. At the bottom of region 3 in FIG. 10, the charge reservoir voltage has dropped to a voltage level that is below the POR-Z threshold. If only a capacitor were used to provide assist current, the storage device would have reset due to reaching the POR-Z threshold. However, the operation of the boost assist regulator allows operation even below the POR-Z level, with the use of a capacitor that is of reasonable size and cost. The lower the allowed voltage, the more the reservoir gets drained, and the longer it takes to recharge. Put another way, the higher the amplitude of requested current, the harder the charge leveler works, and the longer it takes to recover.

It should be understood that the embodiments of charge levelers 500 and 600 described herein may be used for current management between a host system and electronic devices and integrated circuits that draw power from the host, and that such devices and integrated circuits may vary without departing from the scope of the disclosure.

Figure 11:
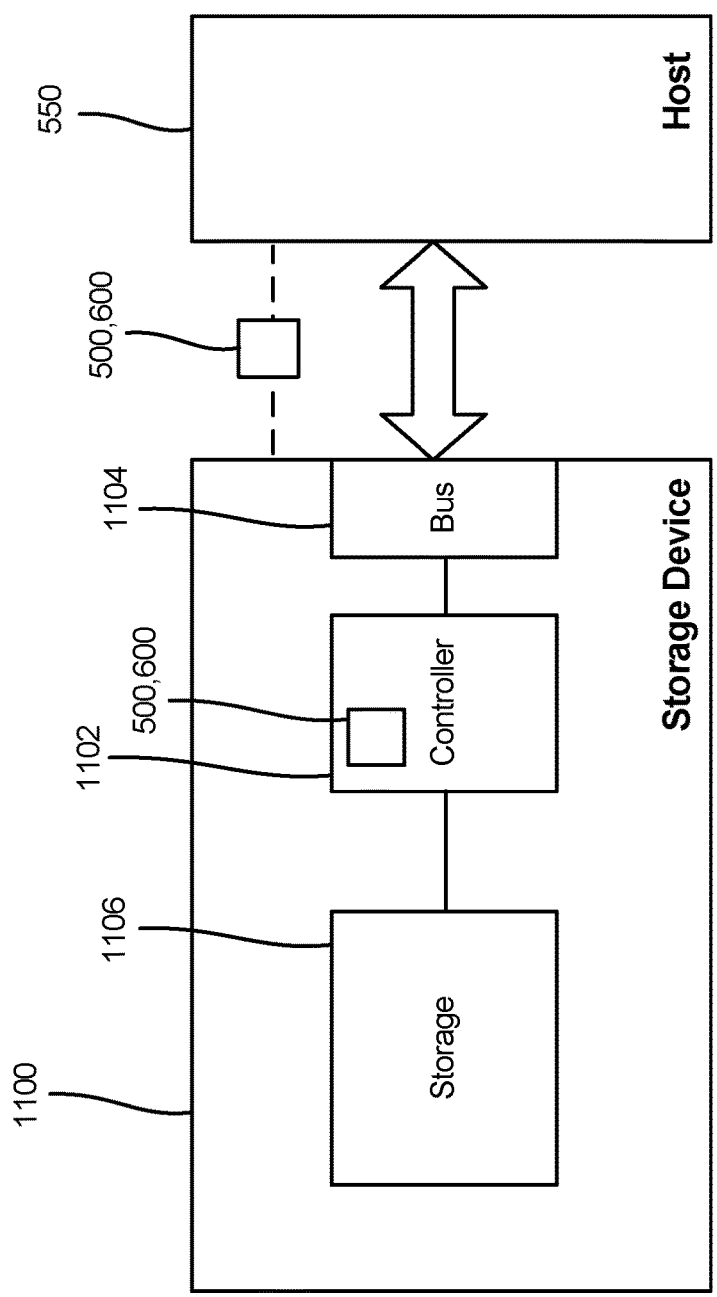
FIG. 11 is a block diagram of a data storage device on which embodiments of the present disclosure may be used.

Referring now to FIG. 11, a simplified block diagram of a storage system 1100 in accordance with an embodiment of the present disclosure is shown. Storage system 1100 may be any storage system, such as is in one embodiment a hard disc drive including by way of example rotatable discs; write heads; and associated controllers such as are known in the art; or in another embodiment a solid state drive including non-volatile memory and associated controllers such as are known in the art; or any other storage system for persistent storage of information. System 1100 may include, by way of example, a controller 1102 coupleable via a bus 1104 or the like to a host system 1150, where the host system 1150 may provide power over the bus 1104 or through a separate power bus (not shown), and a storage component 1106 (such as rotatable platters or nonvolatile memory). A charge leveler circuit such as circuits 500 or 600 described herein may be provided either as a stand-alone device between the host 1150 and storage device 1100, or as a part of the storage device 1100, such as on an integrated circuit, ASIC, or the like.

In accordance with various embodiments, the methods described herein may be implemented as one or more software programs running on one or more microprocessors or controllers, such as the microprocessor/controller included in a data storage device such as data storage device 1100. Dedicated hardware implementations including, but not limited to, application specific integrated circuits, programmable logic arrays and other hardware devices can likewise be constructed to implement the methods described herein, or to incorporate the circuitry described herein. It should be understood that controller 1102 may be implemented not only in a storage device such as device 110, but also as a part of a servo-ASIC, PCBA, or the like, without departing from the scope of the disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A charge leveler configured to be coupled between an external power supply and a data storage device, the charge leveler comprising:
   a current limiter couplable to receive an input current from the external power supply, the current limiter configured to provide a limited input current at no more than a pre-determined level; and
   a charge reservoir couplable in parallel with an output of the current limiter to supplement the limited input current to the data storage device when the pre-determined level is exceeded, and to receive surplus limited current from the current limiter to replenish the charge reservoir with the surplus current when the data storage device draws less current than the pre-determined level.

2. The charge leveler of claim 1, and further comprising a boost assist regulator comprising:
   a boost assist controller;
   a boost assist Schottky diode having an output coupled in parallel to the limited current;
   a boost assist inductor coupled between the charge reservoir and an input of the boost assist Schottky diode;
   a comparator having a sensed voltage of the data storage device as a first input, having an adjusted nominal voltage of the external power supply as a second input, and having an output coupled to the boost assist controller to control operation of the boost assist controller; and
   a boost assist charge transistor coupled drain to source between the input of the boost assist Schottky diode and a reference voltage, and gate coupled to be operated by the boost assist controller.

3. The charge leveler of claim 2, wherein the adjusted nominal voltage is a determined percentage of the nominal external power supply voltage.

4. The charge leveler of claim 3, wherein the determined percentage is 93 percent.

5. The charge leveler of claim 1, and further comprising a boost assist regulator configured to monitor a requested current from the data storage device, and initiate operation of the charge reservoir to supplement the limited input current when the requested current exceeds the limited input current.

6. The charge leveler of claim 2, wherein the boost assist regulator provides an additional current boost to the limited input current through a boost assist inductor and a boost assist Schottky diode coupled in series with the charge reservoir.

7. The charge leveler of claim 1, wherein the current limiter comprises:
   an isolation transistor;
   a sense resistor in series with the isolation transistor; and
   a comparator to compare current requested by the data storage device with the pre-determined level.

8. The charge leveler of claim 1, and further comprising a controller coupled to the current limiter to initiate operation of the charge reservoir to add current in excess of the pre-determined level when a high current operation of the data storage device occurs.

9. The charge leveler of claim 1, wherein the charge reservoir further comprises:
   a capacitor; and
   a switch coupled to pass the limited input current to or to block the limited input current from the capacitor.

10. A charge leveler system, comprising:
    a controller coupleable to an external power supply;
    a storage component coupled to the controller; and
    a charge leveler coupled to the controller, the charge leveler comprising:
      a current limiter couplable to receive an input current from the external power supply, the current limiter configured to output a limited current at no more than a pre-determined level; and
      a charge reservoir couplable to the current limiter output to supplement the limited current when the pre-determined level is exceeded, and to replenish the charge reservoir with surplus limited current in excess of current requested by an external data storage device couplable to the charge leveler system when the pre-determined level is not exceeded.

11. The charge leveler system of claim 10, wherein the charge leveler further comprises a boost regulator, the boost regulator comprising:
    a boost assist controller;
    a boost assist Schottky diode having an output coupled in parallel to the limited current;
    a boost assist inductor coupled between the charge reservoir and an input of the boost assist Schottky diode;
    a comparator having a sensed voltage of the data storage device as a first input, having an adjusted nominal voltage of the external power supply as a second input, and having an output coupled to the boost assist controller control operation of the boost assist controller; and
    a boost assist charge transistor coupled drain to source between the input of the boost assist Schottky diode and a reference voltage, and gate coupled to an output of the boost assist controller to be operated by the boost assist controller.

12. The charge leveler system of claim 10, and further comprising a controller configured to monitor a requested current from the data storage device and to initiate operation of the boost assist regulator to add current in excess of the pre-determined level when a high current operation of the data storage device occurs.

13. The charge leveler system of claim 10, wherein the current limiter comprises:
    an isolation transistor;
    a sense resistor in series with the isolation transistor; and
    a comparator to compare current requested by the data storage device with the pre-determined level.

14. The charge leveler system of claim 10, and further comprising a boost assist regulator configured to monitor a requested current from the data storage device, and initiate operation of the charge reservoir to supplement the limited current when the requested current exceeds the limited current.

15. The charge leveler system of claim 14, wherein the boost assist regulator provides an additional current boost to the limited current through a boost assist inductor and a boost assist Schottky diode coupled in series with the charge reservoir.

16. The charge leveler system of claim 10, and further comprising
    a controller coupled to the current limiter to monitor the limited current versus a requested current from the data storage device, and to couple the charge reservoir to the boost regulator to provide current in excess of the pre-determined level when a high current operation of the data storage device occurs.

17. A method for charge leveling an input current provided to a data storage device from an external power supply, the method comprising:
   limiting the input current to no more than a pre-determined level of the external power supply; and
   adding a boost current supplied by a charge reservoir and a boost assist regulator to the limited input current.

18. The method of claim 17, wherein limiting the input current comprises:
   setting a limit on the input current;
   comparing the current being drawn by the storage device and the limit with a comparator; and
   limiting the current using a field effect transistor coupled in series with a sense resistor.

19. The method of claim 17, wherein adding the boost current comprises:
   coupling a capacitor of a charge reservoir to the limited input current to add the boost current to the limited input current and to supply the combined boost current and limited input current to the data storage device when the pre-determined level is exceeded.

20. The method of claim 19, and further comprising:
   coupling the capacitor to the limited input current to charge the capacitor with the limited input current when the pre-determined level is not exceeded; and
   boosting the boost current from the capacitor through an inductor and a Schottky diode coupled in series between the capacitor and the limited input current.

* * * * *